US010075602B2

(12) United States Patent
Gine Leon et al.

(10) Patent No.: US 10,075,602 B2
(45) Date of Patent: Sep. 11, 2018

(54) MEDIA PROCESSING

(71) Applicant: HEWLETT-PACKARD DEVELOPMENT COMPANY, L.P, Houston, TX (US)

(72) Inventors: Jordi Gine Leon, Barcelona (ES); Aviv Hassidov, Sant Cugat del Valles (ES); Miriam Llorens Carrobe, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/124,269

(22) PCT Filed: Apr. 4, 2014

(86) PCT No.: PCT/EP2014/056808
§ 371 (c)(1),
(2) Date: Sep. 7, 2016

(87) PCT Pub. No.: WO2015/149865
PCT Pub. Date: Oct. 8, 2015

(65) Prior Publication Data
US 2017/0019548 A1 Jan. 19, 2017

(51) Int. Cl.
*H04N 1/00* (2006.01)

(52) U.S. Cl.
CPC ....... *H04N 1/00779* (2013.01); *H04N 1/0097* (2013.01); *H04N 1/00689* (2013.01); *H04N 1/00694* (2013.01); *H04N 2201/0081* (2013.01); *H04N 2201/0094* (2013.01)

(58) Field of Classification Search
CPC .......... H04N 1/00779; H04N 1/00687; H04N 1/00694
USPC ............................................... 358/1.12, 1.13
See application file for complete search history.

(56) References Cited

U.S. PATENT DOCUMENTS

| 5,878,319 | A | 3/1999 | Itoh | |
|---|---|---|---|---|
| 6,421,135 | B1 | 7/2002 | Fresk et al. | |
| 6,456,403 | B1 * | 9/2002 | Archer | H04N 1/00795 358/468 |
| 7,194,217 | B2 | 3/2007 | Hosoi | |
| 8,066,274 | B2 | 11/2011 | Chen et al. | |
| 2002/0154322 | A1 * | 10/2002 | Tretter | H04N 1/4095 358/1.9 |
| 2003/0058484 | A1 * | 3/2003 | Kuo | H04N 1/00005 358/474 |
| 2003/0146561 | A1 | 8/2003 | Chen et al. | |
| 2004/0070798 | A1 * | 4/2004 | Andersen | G03G 15/607 358/498 |

(Continued)

*Primary Examiner* — Jamares Q Washington
(74) *Attorney, Agent, or Firm* — HP Inc. Patent Department

(57) ABSTRACT

Certain methods of processing media by a media processing device are described. An example media processing device has an input comprising a sensor for detecting media therein. The media processing device processes a first item of media. The media processing device detects a second item of media at the input and is arranged to conditionally control the media processing device. In one example, the media processing device processes a second item of media according to a first set of settings for the first item of media. In another example, the media processing device ejects the first item of media.

20 Claims, 3 Drawing Sheets

(56) References Cited

U.S. PATENT DOCUMENTS

| | | | |
|---|---|---|---|
| 2005/0111894 A1* | 5/2005 | Hosoi | G03G 15/607 399/371 |
| 2007/0119941 A1* | 5/2007 | He | G06K 7/10 235/462.15 |
| 2010/0020370 A1* | 1/2010 | Ishikawa | H04N 1/00413 358/498 |
| 2010/0058123 A1 | 3/2010 | Yamashirodani et al. | |
| 2010/0134857 A1 | 6/2010 | Tsai et al. | |
| 2011/0170125 A1* | 7/2011 | Asada | H04N 1/00209 358/1.12 |
| 2015/0215481 A1* | 7/2015 | Faust | H04N 1/00225 358/1.13 |

* cited by examiner

MEDIA PROCESSING

BACKGROUND

Media processing devices, such as scanners, fax machines, and the like are often used to process items of media. It is sometimes useful to process a number of items of media within a single media processing session. This is often referred to as batch processing. Such batch processing can be relatively labour-intensive for the user of the media processing device, requiring the user to perform various operations in relation to the media processing device, such as configuring settings of the media processing device, throughout the media processing session.

DETAILED DESCRIPTION

Figure 1:
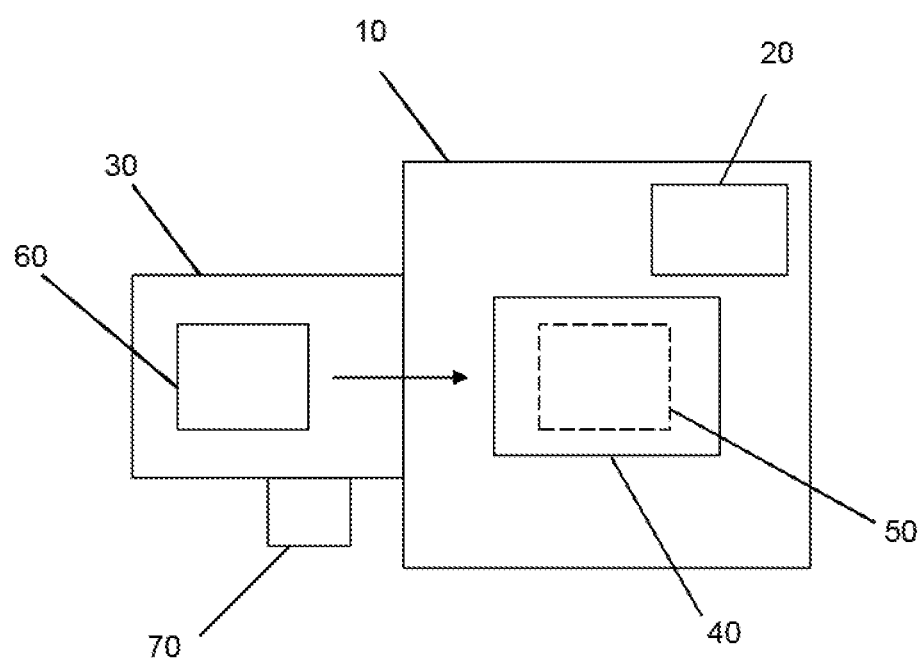
FIG. 1 is a schematic diagram showing a media processing device according to an example.

Certain examples described herein relate to media processing devices. Media processing devices may include, for example, printers, scanners, fax machines, photocopiers, or, more generally, any device that performs processing in relation to media.

Media is typically formed in sheets of material, such as paper, card, or plastic. However, media may be differently shaped or configured. In general, media may be any material, or a plurality of materials, arranged in any shape or configuration.

Media is typically input into a media processing device in "items". An item of media could include, amongst other things, an individual sheet of media, a web of media, or a portion of a roll of media. In the case where media is formed in a roll, the portions of the roll of media forming individual media items may be delimited by markings visible on the roll of media. In one example, the media processing device may be a 3D object scanner that, is configured to form representations of objects input into the scanner. In this case an "item" of media could be one or more objects to be scanned by the scanner, and the media can be considered to be the material from which the object is formed.

Media processing devices typically process media whereby to produce one or more outputs. For example, where the media processing device comprises a 2D (two-dimensional) scanner, an output may be a copy of an image visible on the item of media being scanned. Where the media processing device comprises a printer, an output may comprise an image that is printed by the printer onto an item of media. Where the media processing device is a 3D (three-dimensional) object scanner, the output may be a representation of the object being scanned.

To account for different user requirements, a media processing device may be capable of processing media in a number of modes. For example, a scanner may operate in different modes depending on e.g. the number of copies a user wants to produce, and/or the colour, resolution and size in which the user wants the copies to be produced.

Typically, before media can be processed by a media processing device, a user may configure the mode of operation of the media processing device by defining a set of settings specifying how the media should be processed. This setting process can be relatively arduous for the user, particularly where the user has multiple items of media to process, and has to configure settings for each item. Where the media processing device accommodates a wide range of processing options, the user may be required to select from a large number of setting options, which can be both complicated and time-consuming for the user.

Some media processing devices have a "batch" mode, which is intended to simplify the setting process for a user when the user wishes to process multiple items of media as a "batch". In a batch mode, a particular set of settings may be applied to each item of media within a batch. This means the user does not have to re-configure the settings of the media processing device for each item in the batch.

However, typically, the user may be required to configure the media processing device to operate in the batch mode before any processing is commenced. This initial process of configuring the batch mode can be quite complicated and time consuming for the user. It has been realised that, by configuring a media processing device such that it autonomously determines whether it operates in a batch mode, this problem can be solved. The following disclosure provides certain examples for processing media, wherein a media processing device autonomously determines whether it is to operate in a batch mode. Certain examples may also limit damage to sheets of media when processed by a media processing device.

First, however, an example of a media processing device which may be used to carry out such a method for processing media will be described. FIG. 1 is a schematic diagram showing a number of components of a exemplary media processing device 10 according to an example.

The media processing device 10 comprises at least one processor 20, which may be configured to cause the media processing device 10 to carry out a method, such as one or both of the methods described below in relation to FIGS. 2 and 3.

The media processing device 10 comprises an input 30. The input 30 is for receiving media that is to be processed by the media processing device 10. As an example, the input 30 may in the form of a tray, or support, onto which a user may place media that is to be processed by the media processing device 10.

In the particular example shown in FIG. 1, the media processing device 10 is configured to draw one or more sheets of media residing in the input 30 into the body of the media processing device 10 for processing. The media processing device 10 is configured to process media by feeding sheets of media along a media path, and past one or more components 40 that are configured to process the media. The components 40 could include, for example, imaging components configured to produce a copy of an image visible on the media, imaging components arranged to produce a n-dimensional (e.g. 3D) representation of the media and/or printing components configured to produce an image on the media. Once processed, the media may be fed further along the media path to an output of the media processing device 10.

In alternative examples, the media processing device 10 may be configured to process items of media other than sheets of media. For example, the media processing device 10 may be configured to process, amongst other things, one or more objects, one or more portions of a roll of media, or one or more webs of media.

FIG. 1 shows schematically a first sheet of media 50, which is being fed along a media path of the media processing device 10. A second sheet of media 60 is also shown, which is residing within the input 30.

The input 30 comprises at least one sensor 70, which is suitable for detecting a sheet of media at the input 30. The sensor 70 could be any type of sensor that is capable of detecting the presence or absence of a sheet of media. For example, the sensor could be one or more of: a pressure sensor, an optical sensor, a motion sensor, or the like.

Figure 2:
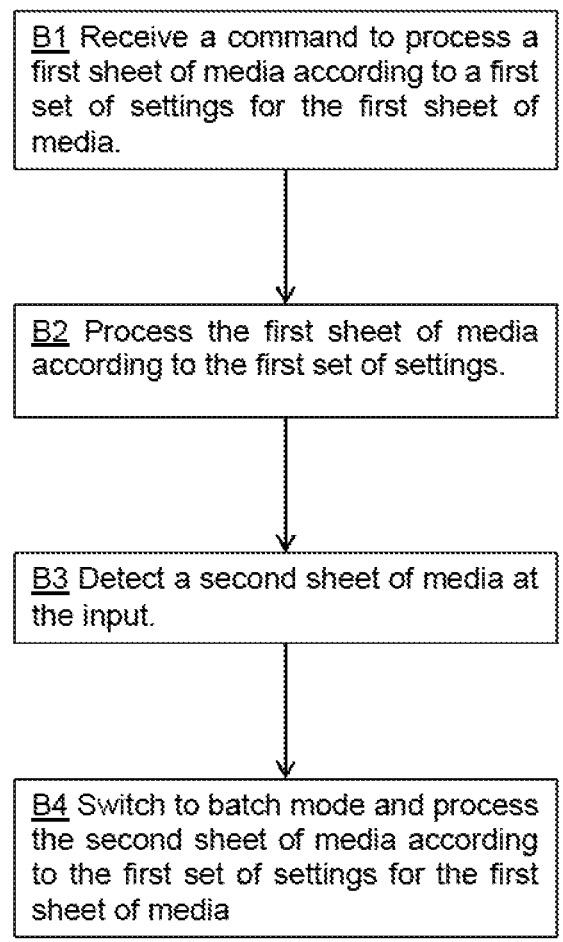
FIG. 2 is a flow diagram illustrating a method according to an example; and, FIG. 3 is a flow diagram illustrating another method according to an example.

FIG. 2 is a flow diagram showing a method for processing media by a media processing device 10, such as the media processing device illustrated schematically in FIG. 1.

The method comprises a first block, B1, of receiving a command to process a first sheet of media 50 according to a first set of settings for the first sheet of media 50. The command may be received from a user interface of the media processing device 10. Alternatively, the command may be received from a device that is communicatively connected to the media processing device 10 e.g. via a wired or wireless connection.

The first set of settings may have been defined by a user of the media processing device 10. For example, the user may have selected the settings from a list of setting options, and may have programmed the settings into the media processing device 10 via a user interface of the media processing device 10, or via a device that is communicatively connected to the media processing device 10.

The first set of settings may define the way in which the first sheet of media 50 is to be processed and/or properties of an output to be produced by the media processing device 10. As an example, in the case that the media processing device 10 is a scanner, the settings may define e.g. the colour depth in which a copy of the first sheet of media 50 is to be produced. The user may select from a list of colour depths such as, amongst others, 1-bit monochrome, 8-bit grey scale, and 8-bit colour.

Additionally or alternatively, again in the case where the media processing device 10 is a scanner, the first set of settings may define the size to which a copy of the first sheet of media 50 is to be produced. As an example, a user may select from a list of conventional paper sizes, such as A1, A2, A3, and A4, whereby to configure the first set of settings. Additionally, or alternatively, the user may be able to configure a zoom ratio for the copy relative to the size of the first sheet of media 50. The user may be able to set a zoom ratio for a first axis of the first sheet of media 50 independently from a second axis. In other words, the user may be able to configure the media processing device 10 to produce a copy of the first sheet of media 50 which is stretched along an axis of the first sheet of media 50.

As a further example, again in the case where the media processing device 10 is a scanner, the first set of settings may define the resolution to which the copy of the first sheet of media is to be produced. As an example, a user may be able to select from a list of possible resolutions such as 300 dpi (dots-per-inch), 600 dpi and 1200 dpi.

Where, again, the media processing device 10 is a scanner, the first set of settings may define one or more locations to which a copy of the first sheet of media 50 is to be saved and/or sent. As a particular example, the first set of settings may specify that the copy of the first sheet of media is to be saved to a storage device, such as a USB stick, a CD, or memory card connected to the media storage device 10. Additionally or alternatively, the first set of settings may specify that the copy of the first sheet of media 50 is to be sent to a device that is remote from the media processing device 10. The copy may be sent via a wired or wireless connection, for example. As a specific example, the first set of settings may specify that the copy of the first sheet of media 50 is to be sent to a print queue of a printer. As a further example, the first set of settings may specify that the copy of the first sheet of media 50 is to be sent as an email to an email address specified by the first set of settings. The first set of settings may additionally specify the file format in which the copy of the first sheet of media 50 is to be saved and/or sent. Example formats may include Portable Document Format (PDF), Joint Photographic Experts Group (JPEG) format or Tagged Image File Format (TIFF).

Further example settings in the case where the media processing device 10 is a scanner may relate to the properties of the first sheet of media 50. For example, the settings may specify a way in which the media 50 should be processed and/or handled, which depend upon the type of material of the first sheet of media and/or the features visible on the surface of the media 50. To configure the settings, the user may select the type of material of the first sheet of media 50 from a list including e.g. "photo paper", "plain paper", "blueprint" and so on. The user may also select the type of features visible on the surface of the media 50 from a list including e.g. "text only", "image only" and "mixed text and image". The user's selections may be used to define the scan settings for the media processing device 10 which depend on the type of the first sheet of media 50.

As a further example, the first set of settings may specify that the background of the first sheet of media 50 should be removed from the copy of the first sheet of media 50. In this case, after a copy of the first sheet of media 50 has been produced, the media processing device 10 may perform processing on the copy to eliminate any features of the copy which are determined to be background features.

Many of the above scan settings are also applicable where the media processing device 10 is a 3D object scanner that is configured to produce a representation of a three dimensional object. In addition, the scan settings may define the properties of the representation that is to be produced. For example, the scan settings may define that the representation is to be produced as a digital image. The settings may further specify the file format in which the digital representation is to be created, and/or the location to which the digital representation is to be sent.

In another example, the media processing device 10 may be a printer and the first set of settings may define print settings, including corresponding variables for producing a printed output. Such print settings could define, for example, the properties of the item of media on which an image is to be printed. Example properties can include e.g. the size and/or "type" of the item of media. For example, the print settings may specify that the item of media is an A4 sheet of photographic paper, and the printer may operate in a particular print mode suitable for those properties whereby to produce a printed output on the media.

In any event, in the present example, responsive to receipt of a command to process a first sheet of media 50 according to a first set of settings for the first sheet of media 50, the processor 20 is configured to cause the media processing device 10, at block B2, to process the first sheet 50 of media according to the first set of settings. Where the media processing device 10 is one which processes media by feeding the media along a media path as described above, the command to process a first sheet of media 50 may cause the media processing device 10 to draw a sheet of media 50 residing in the input 30 into the body of the media processing device 10. The media processing device 10 may feed this first sheet of media past the processing components 40 whereby to process the first sheet of media 50. In one arrangement, the input 30 may be able to hold multiple sheets of media, in which case, the media processing device 10 may be configured to draw a just single one of those sheets—for example, a top sheet—into the body of the media processing device 10, where it is processed. The input 30 may, in this case, comprise an auto feed mechanism configured to feed one sheet of media at a time, from the input 30 into the body of the media processing device 10.

Next, at block B3, the processing system 20 is configured to determine, via the sensor 70, whether there is a second sheet of media 60 within the input 30. In response to the detection of a second sheet of media 60 at the input 30, the processor 20 is configured to switch, at block B4, the operation of the media processing device 10 to a batch mode, and to process the second sheet of media 60 according to the first set of settings for the first sheet of media 50. In other words, once in the batch mode, the media processing device 10 is configured to process the first sheet of media 50 and the second sheet of media 60 in the same way.

In the present method the user is not required to manually configure the media processing device 10 to operate in a batch mode. Instead, the media processing device 10 autonomously determines whether a batch mode should be operated depending on whether a second sheet of media is present at the input 30, and applies the first set of settings when processing the second sheet of media 60 without requiring any user input.

Additionally, the user is not required e.g. to press a "start" button or otherwise manually cause the media processing device 10 to begin processing of the second sheet of media 60. Instead, the media processing device is triggered to process the media upon the detection of the second sheet of media 60 at the input 30.

Thus, the present example enables a user of a media processing device 10 to process a number of sheets of media without being required to perform any manual interaction (such as the configuration of processing settings) once processing of the first sheet of media 50 has begun. This is particularly useful, for example, where a user wishes to process large sheets of media which require the user to manually feed the sheets into the media processing device 10. As will be appreciated, in this situation, a user will find it difficult to configure settings on the media processing device 10 whilst feeding the media into the device. Certain described examples overcome this difficulty.

In one arrangement, in the event that the media processing device 10 receives a command to finish a processing session before a second sheet of media 60 is detected at the input 30, the media processing device 10 may enter a standby mode in which it waits to receive a new command to process media at block B1. The command may, in one arrangement, be triggered by a user pressing a "finish" button on the media processing device 10.

In the standby mode, subsequent detection of a sheet of media at the input 30 will not cause the media processing device 10 to process the sheet of media in a batch mode.

Additionally, or alternatively, the media processing device may be configured to enter such a standby mode after a predetermined period of time has elapsed since the first sheet of media 60 was processed, and during which no second sheet 60 has been detected. Such a predetermined period of time could be e.g. 1 minute.

In one example, the batch mode is a mode in which any subsequent sheets of media detected at the input of the media processing device are also processed according to said first set of settings for the first sheet of media upon detection at the input. Thus, upon detection of a further sheet of media at the input 30, the media processing device 10 may be configured to process the further sheet of media according to the first set of settings for the first sheet of media 50.

The media processing device 10 may continue to operate in the batch mode until a command to end the processing session is received by the processor 20. As mentioned above, such a command could be received e.g. by a user pressing a "finish" button on the media processing device 10. Additionally, or alternatively, the media processing device 10 may continue to operate in the batch mode until a predetermined period has elapsed since a last sheet of media was detected at the input 30, and during which, no subsequent sheets of media have been detected. Such a predetermined period of time could be e.g. 1 minute.

Upon receipt of a command to end the processing session, or upon expiry of a predetermined period during which no subsequent sheets of media have been detected, the media processing device 10 may return to a standby mode as discussed above.

In a particular example, the media processing device 10 is a scanner, and the first set of settings define scan settings, including the colour depth, size and/or resolution of the copy of the first sheet of media 50. The first set of settings also specify that the copy of the first sheet of media 50 should be saved to a particular storage device connected to the media processing device 10.

In this example, upon detection of a second sheet of media 60 at the input 30, the processor 20 causes the media processing device 10 to scan the second sheet of media 60 and to produce a copy in the colour depth, size and resolution specified in the first set of settings. The processor 20 then causes the media processing device 10 to save the copy of the second sheet of media 50 to the storage device specified in the first set of settings.

If further sheets of media are detected at the input 30 before a command to finish the processing session is received by the media processing device 10, these are also scanned as described above, and saved to the specified storage device.

By autonomously applying the same scan settings as were specified for the first sheet of media 50, and saving each copy to the location specified for the first sheet of media, the burden on the user in processing a large number of sheets of media is substantially reduced. The user need not, for example, define, or confirm, a location to which a copy is to be saved for each sheet of media. Instead, the copies are automatically saved to the defined location.

The processor 20 may be configured to automatically name the copies according to a predetermined naming convention before sending or saving each copy to the predetermined location.

In one example, before a scanning session has finished, a user may be able to review the status of the copies of the documents scanned in the scanning session via e.g. a user interface of the media processing device, or via another device communicatively connected to the media processing device 10. For example, the user may be able to review the status of the transfer of the copies to the location defined in the first set of settings (e.g. the status may indicate that the transfer has not yet begun, is in progress, or has been completed). Where the transfer has not begun, or has not been completed, the user may be given the option to cancel the transfer and delete the copies.

The user may be able to preview the copies via a user interface. In this example, the media processing device 10 may have temporarily saved the copies in a memory of the media storage device 10 in order to enable the user to subsequently review them. This may be useful in assisting the user to determine whether or not to cancel the transfer. As another example, the user may be given the option to save or send the copies to a further or alternative destination, which may include, in particular, a print queue.

Whilst the above method has been described in relation to the media processing device 10 depicted schematically in FIG. 1, the method may equally be carried out by a media processing device that is differently configured. As an example, the method may be carried out by a media processing device in which media to be processed remains substantially stationary with respect to the input 30 while it is being processed. In this case, the media processing device 10 may comprise components which are configured to move relative to the media, whereby to process the media. An example of such a media processing device 10 is a flatbed scanner, in which media remains stationary on a scanning bed, while a scanning arm moves relative to the media to scan the media.

In one example, the media processing device 10 is a printer and the first set of settings define print settings, including corresponding variables for producing a printed output. In a specific example, the printer may comprise an input 30 for handling "special" media, such as large, fragile and/or valuable media. The user may feed one item of media into the printer input 30 at a time so as to avoid damage to the media. Once the print settings for a first item of media have been configured the printer may be configured to apply the same settings to subsequent items of media that are detected at the input 30 within the same processing session. A processing session may be terminated in response to a command to terminate a processing session, or after a predetermined period of inactivity, as described above.

Figure 3:
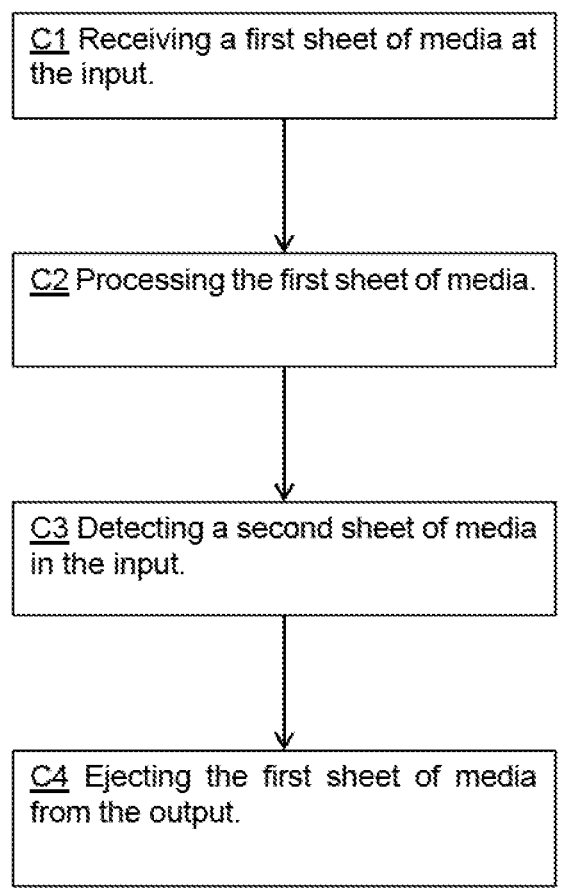

FIG. 3 is a flow diagram showing another example method for processing media by a media processing device, such as the media processing device shown schematically in FIG. 1. The method may be implemented in addition, or as an alternative, to the method of FIG. 2.

The method begins, at block C1, with a first sheet of media 50 being received at the input 30 of the media processing device 10. The first sheet of media 50 is then, at block C2, processed by the media processing device. The media processing device 10 may be configured to begin processing of the first sheet of media 50 in response to the receipt of a command to process the first sheet of media 50, as described above. Alternatively, the media processing device 10 may be configured to begin processing of the first sheet of media 50 in response to the detection of by the sensor 70 of the first sheet of media 50 at the input 30.

In any event, after having processed the first sheet of media 50, the sensor 70 detects, at block C3, whether a second sheet of media 60 has been received at the input 30. If a second sheet of media 60 is determined to have been received at the input 30, the media processing device 10 is configured to eject the first sheet of media 10 from a media output of the media processing device 10.

In one arrangement, in the event that a second sheet of media is not detected at the input, the first sheet of media 50 is retained in the media processing device 10.

In a comparative media processing device, processed media is ejected immediately after it has been processed. In this case, there is no guarantee that there will be a user in the vicinity of the media processing device 10 who is available to collect the processed media and therefore the processed media may simply be ejected from the media processing device 10, and onto the surrounding floor or table. This is undesirable, particularly where the media being processed is, for example, an important or delicate document.

In the present example, on the other hand, media is ejected from the media output of the media processing device 10 upon detection of a second sheet of media 60 at the input 30. The present method is particularly useful where the user is required to feed sheets of media into the input 30 one at a time. This is because, in the event that a second sheet of media 60 is present at the input, it can be determined that a user is also present in the vicinity of the media processing device 10. Thus, by ejecting the first sheet of media 60 upon detection of a second sheet of media 60 at the input 30, it can be guaranteed that there will be a user in the vicinity of the media processing device 10 who will be able to collect the first sheet of media 50 when it is ejected. In one arrangement, the input 30 may be configured such that it is only able to receive one sheet of media. Thus the user of the media processing device 10 is caused to feed sheets of media into the media processing device 10 one at a time.

In one example, a user may be able to cause the media processing device 10 to eject the first sheet of media 50 before a second sheet of media is detected at the input 30. For example, the media processing device 10 may comprise an "eject" button, which sends a command to the processor 20 to cause the first sheet of media 50 to be ejected from the media output of the media processing device 10. Alternatively, a command to eject the first sheet of media 50 may be triggered by the user pressing a button to indicate that a scanning session has been completed. By this feature, a user may retrieve a processed sheet of media without having to insert a second sheet of media into the input 30.

As with the method of FIG. 2, the method of FIG. 3 has been described in relation to the particular media processing device 10 illustrated schematically in FIG. 1. However the method may also be carried out by a media processing device that is differently configured. In addition, the method may be carried out in relation to items of media other than sheets of media.

The above examples are to be understood as illustrative. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

While a number of examples have been described in relation to sheets of media, the examples may also be applied to items of media other than sheets. An "item" of media can include any object, a portion of an object, or a plurality of objects, which can be input into a media processing device. An item of media may include, for example, an individual sheet of media, a web of media, or a portion of a roll of media. In the case where media is formed in a roll, the portions of the roll of media forming individual media items may be delimited by markings visible on the roll of media.

The term "media" should be taken to cover any material, or a plurality of materials, in any shape or configuration. Where an item of media is an object, the media is the material from which the object is formed.

Media processing devices can include, for example, printers, scanners (both 2D and 3D object scanners), fax machines, photocopiers, or, more generally, any device that performs processing in relation to media. As mentioned, media processing devices typically produce outputs as a result of media processing. Where a media processing device comprises a 2D scanner, an output may be a copy of an image visible on the item of media being scanned. The copy may be represented as a digital image, for example. Where the media processing device comprises a printer, an output may be an image that is printed on the item of media being processed. Where the media processing device comprises a 3D object scanner, the output may be a representation of the object (i.e. item of media) being scanned.

As also mentioned above, a media processing device may be configured to process an item of media according to a set of settings for the item of media. The settings may define, for example, how the item of media should be handled and/or processed by the media processing device. The settings may additionally or alternatively define properties for an output of the media processing device that is to be produced as a result of processing the item of media.

Although at least some aspects of the examples described herein with reference to the drawings comprise computer processes performed in processing systems or processors, the examples also extends to computer programs, particularly computer programs on or in a carrier, adapted for putting the examples into practice. These programs may be processed by at least one processor of a media processing device, for example at least one processor 10. Alternatively they may be processed by a coupled computing device that is arranged to send appropriate commands to the media processing device. The program may be in the form of non-transitory source code, object code, a code intermediate source and object code such as in partially compiled form, or in any other non-transitory form suitable for use in the implementation of processes according to the examples. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the examples. In this regard, the examples may be implemented at least in part by computer software stored in (non-transitory) memory and executable by the processor, or by hardware, or by a combination of tangibly stored software and hardware (and tangibly stored firmware).

What is claimed is:

1. A method of processing media by a media processing device, the media processing device having an input comprising a sensor for detecting media therein, and the method being responsive to a command to process a first item of media according to a first set of settings for the first item of media, the method comprising:
   processing the first item of media according to the first set of settings; and,
   responsive to detection of a presence of second item of media at the input, switching to a batch mode;
   responsive to not detecting the second item of media at the input within a predetermined period of time, preventing the media processing device from entering the batch mode; and
   processing the second item of media according to the first set of settings for the first item of media.

2. The method of claim 1, wherein responsive to detection of the second item of media at the input, the method further comprises ejecting the first item of media from an output of the media processing device.

3. The method of claim 1, wherein the batch mode is a mode in which any subsequent items of media detected at the input of the media processing device are processed according to the first set of settings for the first item of media upon detection at the input.

4. The method of claim 1, wherein the first set of settings for the first item of media define one or more of:
   one or more indicated properties of the first item of media;
   a colour depth in which an output is to be produced,
   a size to which an output is to be produced, and
   a resolution to which an output is to be produced.

5. The method of claim 4, wherein the first set of settings comprise scan settings and also define a location to which a copy of the first item of media is to be sent or saved, and wherein the step of processing the second item of media according to the first set of settings for the first item of media comprises scanning the second item of media, and sending or saving the copy of the second item of media to the defined location.

6. The method of claim 5, comprising sending or saving the copies of the first and second items of media to the defined location as a single file.

7. The method of claim 5, wherein the predetermined location is a print queue of a printer communicatively connected to the media processing device.

8. A method of processing media by a media processing device, the media processing device having an input comprising a sensor for detecting media therein, and a media output, the method comprising:
   receiving a first item of media at the input;
   processing the first item of media;
   responsive to detection of a second item of media in the input:
      ejecting the first item of media from the media output; and
      switching to a batch mode; and
   responsive to not detecting the second item of media at the input within a predetermined period of time, preventing the media processing device from entering the batch mode.

9. The method of claim 8, wherein the input is configured to receive one item of media at a time.

10. The method of claim 8, wherein, in the event that a second item of media is not detected at the input, the first item of media is retained in the media processing device.

11. The method of claim 8, wherein, in the event that a command to eject the first item of media is received before a second item of media is detected at the input, the method comprises ejecting the first item of media from the media output in response to said command.

12. A processing system for a media processing device, the media processing device having an input comprising a sensor for detecting media therein, the processing system being constructed and arranged to cause the media processing device to perform one or both of a first process and a second process, the first process being caused to be performed in response to a command to process a first item of media according to a first set of settings for the first item of media, and comprising the steps of:
(i) processing the first item of media according to the first set of settings;
(ii) detecting, via a sensor, a presence of a second item of media at the input;
(iii) responsive to detection of the presence of the second item of media at the input within a predetermined period of time:
   switching to a batch mode to process the second item in the same way as the first item; and
   processing the second item of media according to the first set of settings for the first item of media; and
(iv) responsive to not detecting the second item of media at the input within a predetermined period of time, preventing the media processing device from entering the batch mode;
and the second process comprising the steps of:
(i) receiving a first item of media at the input;
(ii) processing the first item of media; and, responsive to detection of a second item of media in the input,
(iii) ejecting the first item of media from a media output of the media processing device.

13. The processing system of claim 12, wherein the batch mode is a mode in which the processing system causes the media processing device to process any subsequent items of media detected at the input of the media processing device according to the first set of settings for the first item of media upon detection at the input.

14. The processing system of claim 12, wherein the first set of settings define one or more of:
one or more indicated properties of the first item of media;
a colour depth in which an output is to be produced;
a size to which an output is to be produced, and
a resolution to which an output is to be produced.

15. The processing system of claim 12, wherein, in the event that a second item of media is not detected at the input, the processing system causes the media processing device to retain the first item of media in the media processing device.

16. The method of claim 1, further comprising receiving the first set of settings from a user interface of the media processing device.

17. The method of claim 1, wherein the first set of settings instruct the media processing device to remove a background from the first item of media.

18. The processing system of claim 12, wherein the media processing device is a three-dimensional (3D) object scanner.

19. The processing system of claim 12, wherein the sensor for detecting media is a pressure sensor.

20. The processing system of claim 12, wherein the sensor for detecting media is a motion sensor.

* * * * *